(12) United States Patent
Ksontini et al.

(10) Patent No.: US 8,001,615 B2
(45) Date of Patent: Aug. 16, 2011

(54) METHOD FOR MANAGING THE SECURITY OF APPLICATIONS WITH A SECURITY MODULE

(75) Inventors: Rached Ksontini, Lausanne (CH); Renato Cantini, Belfaux (CH)

(73) Assignees: Nagravision S.A., Cheseaux-sur-Lausanne (CH); Swisscom Mobile AG, Berne (CH)

( * ) Notice: Subject to any disclaimer, the term of this patent is extended or adjusted under 35 U.S.C. 154(b) by 18 days.

(21) Appl. No.: 10/577,158

(22) PCT Filed: Nov. 3, 2004

(86) PCT No.: PCT/EP2004/052773
§ 371 (c)(1),
(2), (4) Date: Apr. 10, 2007

(87) PCT Pub. No.: WO2005/046278
PCT Pub. Date: May 19, 2005

(65) Prior Publication Data
US 2007/0274524 A1    Nov. 29, 2007

(30) Foreign Application Priority Data
Nov. 4, 2003  (EP) .................................. 03104069

(51) Int. Cl.
*G06F 7/04* (2006.01)
(52) U.S. Cl. ............. 726/29; 726/2; 380/247; 455/26.1
(58) Field of Classification Search ........................ None
See application file for complete search history.

(56) References Cited

U.S. PATENT DOCUMENTS

| | | | |
|---|---|---|---|
| 5,864,757 A | | 1/1999 | Parker |
| 5,898,783 A * | | 4/1999 | Rohrbach .................... 340/5.31 |
| 6,553,375 B1 * | | 4/2003 | Huang et al. .................... 707/10 |
| 6,711,262 B1 * | | 3/2004 | Vatanen ........................ 380/277 |
| 6,804,707 B1 * | | 10/2004 | Ronning ....................... 709/220 |
| 6,944,859 B2 * | | 9/2005 | Bunger ......................... 717/178 |
| 6,947,727 B1 * | | 9/2005 | Brynielsson .................. 455/411 |
| 7,024,226 B2 * | | 4/2006 | Sandberg et al. ............. 455/558 |
| 7,133,920 B2 * | | 11/2006 | Tsujisawa ..................... 709/229 |
| 2002/0062451 A1 * | | 5/2002 | Scheidt et al. ................ 713/201 |
| 2002/0077094 A1 * | | 6/2002 | Leppanen .................... 455/420 |
| 2002/0169983 A1 * | | 11/2002 | Rygaard ....................... 713/201 |

(Continued)

FOREIGN PATENT DOCUMENTS
EP         0757502         7/1996
(Continued)

*Primary Examiner* — Nathan Flynn
*Assistant Examiner* — Michael R Vaughan
(74) *Attorney, Agent, or Firm* — Harness, Dickey & Pierce, P.L.C.

(57) ABSTRACT

A method for managing the security of applications with a security module associated to an equipment connected to a network managed by a control server of an operator. The applications use resources as data or functions stored in the security module locally connected to the equipment. The method may include steps of receiving, analyzing and verifying, by the control server, identification data from the equipment and the security module, generating a cryptogram from the result of the verification of the identification data, transmitting the cryptogram to the security module of the equipment, and selectively activating or selectively deactivating by the security module at least one resource as data or functions of the security module by executing instructions included in the cryptogram and conditioning the functioning of an application according to criteria established by a supplier of the application or the operator or a user of the equipment.

13 Claims, 1 Drawing Sheet

U.S. PATENT DOCUMENTS

| | | | |
|---|---|---|---|
| 2002/0186845 A1* | 12/2002 | Dutta et al. | 380/247 |
| 2002/0188736 A1* | 12/2002 | Jarvensivu | 709/229 |
| 2002/0197991 A1* | 12/2002 | Anvekar et al. | 455/432 |
| 2003/0041125 A1* | 2/2003 | Salomon | 709/220 |
| 2003/0114144 A1* | 6/2003 | Minemura | 455/410 |
| 2003/0236867 A1* | 12/2003 | Natsuno et al. | 709/220 |
| 2004/0092248 A1* | 5/2004 | Kelkar et al. | 455/411 |
| 2004/0110488 A1* | 6/2004 | Komsi | 455/411 |
| 2004/0172542 A1* | 9/2004 | Minemura | 713/176 |
| 2004/0205749 A1* | 10/2004 | Dalton et al. | 717/178 |
| 2004/0250074 A1* | 12/2004 | Kilian-Kehr | 713/172 |
| 2005/0021592 A1* | 1/2005 | Patel et al. | 709/200 |
| 2005/0222949 A1* | 10/2005 | Inotay et al. | 705/40 |
| 2005/0246282 A1* | 11/2005 | Naslund et al. | 705/52 |
| 2008/0233942 A9* | 9/2008 | Kim | 455/419 |

FOREIGN PATENT DOCUMENTS

WO          WO 0042498 A1 * 7/2000

* cited by examiner

METHOD FOR MANAGING THE SECURITY OF APPLICATIONS WITH A SECURITY MODULE

FIELD OF THE INVENTION

The present invention concerns the domain of mobile networks also called cellular networks. More particularly, it concerns the management of the security of the applications that function with a security module associated to a mobile equipment of mobile telephony.

TECHNICAL BACKGROUND

The security module of a mobile or portable telephone is known under the denomination "SIM card" (Subscriber Identity Module) that constitutes the central security element of these telephones. The telephone operator introduces, during manufacturing and/or during the personalization stage, a number called IMSI (International Mobile Subscriber Identification) that serves to identify in a secure and unique way each subscriber desiring to connect to a mobile network. Each mobile telephone, called mobile equipment hereinafter, is physically identified by a number stored in a non-volatile memory of the mobile equipment. This number, called IMEI, (International Mobile Equipment Identifier) contains an identification of the type of mobile equipment and a serial number serving to identify in a unique way a given mobile equipment on a network of the GSM type (Global System for Mobile Communications), GPRS (General Packet Radio System) or UMTS (Universal Mobile Telecommunications System). Furthermore, mobile equipment is characterized by a software version SVN (Software Version Number) indicating the updating state of the base software installed on the mobile equipment. The combination of the identification of the type and of the serial number of the mobile equipment with the software version (SVN) gives a new identification, called IMEISV (International Mobile Equipment Identifier and Software Version Number). The same identification concept also applies to the WLAN (Wireless LAN) or to bidirectional cable TV. The physical identifier can be a MAC address (Media Access Control) that corresponds to the unique address that identifies the configuration of the material of a user on a network IP (Internet Protocol) and the software version can be transmitted by upper layer protocols based on IP.

The ETSI regulations ("European Telecommunications Standards Institute"), define a mobile station (MS, mobile station) composed of an item of mobile equipment (ME, mobile equipment) and a subscription module (SIM, subscriber identity module). This subscriber module is usually removable, that is to say that it can be either withdrawn or transferred from one item of mobile equipment to another.

During the activation of a mobile equipment, more particularly during its connection to the network of an operator, data comprising the identification data is exchanged between the mobile equipment and the management center of the operator that authorizes or prohibits its use.

The document EP0757502 describes a method of locking a user identification module when the physical identifier of the mobile equipment IMEI is on a black list. When the mobile equipment connects to the mobile network, it transmits the identifier IMEI to a management center. The latter makes a comparison to verify the identifier received with the contents of a database where the operator registers the identifiers of stolen or defective mobile equipments. If an identifier received is present in this database, the management center transmits a message containing a locking command to the mobile equipment in question. This command, after verification of its authenticity, is transmitted to the identification module that carries out a locking procedure preventing any further connection of the mobile equipment to the network.

The document U.S. Pat. No. 5,864,757 describes an activation method of a mobile handset with a subscriber module based on the use of a key pertaining to the handset producing a code corresponding to an identifier of the subscriber module. The handset includes a single tamper-proof key. At the time of its activation, the operator's management center transmits a message to the handset serving to calculate a key specific to the operator by using the unique key of the handset. This new key is used in combination with an identifier of the network or of the subscriber module to generate a control word that is confronted with a code stored in the subscriber module. If the control word agrees with the subscriber module code, the handset is activated.

The methods described in these two documents exclusively concern aspects requiring the physical identification of the mobile equipment based, for example, on the identifier IMEI. When these methods are implemented, their effects concentrate only on the locking/unlocking of the subscriber module and/or of the mobile equipment in order to prevent any connection of the mobile equipment to the network.

Presently, mobile equipment offers to the user, in addition to its usual function of establishing telephone conversations by means of an access to a mobile network, the use of numerous other supplementary value added services such as the consultation of various information, remote banking transactions, electronic commerce, access to multimedia contents, etc. These improved services require an increasingly higher level of security in order to protect users against possible frauds caused by third parties seeking to exploit security failures that may appear on the mobile equipments.

Therefore, verification on at least two levels becomes necessary: on one hand at the level of the mobile equipment itself and on the other hand at the level of software applications that allow the functioning of the different services proposed by the operator or by third parties. The aim is to guarantee that the subscriber module operates only with mobile equipment of the type and software version duly authorized or homologated by the operator and/or by the application suppliers. Functioning of the subscriber module is understood to mean the capacity to allow the use of services requested by a user by carrying out a certain number of software applications previously installed in a memory of the mobile equipment and which use the subscriber module as protection mean.

These applications carried out in the mobile equipment use resources available in the subscriber module. Resources are understood to mean different functions and data necessary for the correct functioning of an application. Certain resources can be common to several applications, in particular the functions related to security. The subscriber module can thus block or alter the functioning of certain applications for which the security conditions established by the operator and/or application supplier are not respected in the mobile equipment in question or the rights of the user of the mobile equipment are insufficient.

The aforementioned documents do not cover the software aspects related to a group of mobile equipments such as, for example, information related to software applications installed, a software version number or even a reference to a type or to a model of mobile equipment, etc. Therefore, it concerns the use of a targeted management method of resources of the subscriber module in order to selectively activate/deactivate the applications or application functions using these resources. However, it is not desirable for these operations to prevent the mobile equipment from accessing the network by completely locking the subscriber module.

SUMMARY OF THE INVENTION

The aim of this invention is to propose a management method for the security of the set mobile equipment, subscriber module and applications in order to limit risks related to the fact that a subscriber module could be fraudulently used by applications carried out on a mobile equipment of a type and/or of a software version that fails to fulfill certain predetermined security criteria.

Another aim is to protect the user of the mobile equipment as well as the application suppliers against abuses resulting from the cloning of the mobile equipment and/or of the subscriber module.

These aims are achieved by means of a method for managing the security of applications with a security module functioning in an equipment connected to a network, said network being administrated by a control server of an operator, said applications using the resources (data or functions) stored in a security module connected locally to said equipment, comprising the following preliminary steps:

reception of data comprising at least the type and software version of the equipment and the identity of the security module, via the network, by the control server, analysis and verification by the control server of said data, generation of a cryptogram from the result of the verification on said data, and transmission of said cryptogram, via the network and the equipment, to the security module, said method is characterized in that the security module analyses the cryptogram received and activates, respectively deactivates the resources (data or functions) used by at least one application installed in the equipment, said cryptogram comprising instructions conditioning the functioning of the application according to criteria predetermined by the supplier of said application and/or the operator and/or the user of the equipment.

The resources of the subscriber module are blocked in a targeted way, in order to block or reduce the function of certain applications. The applications of the equipment are not directly blocked: one act indirectly on the applications, that is to say that the blocking effect will be noticed only when the equipment attempts to carry out these applications.

This method applies preferably to the mobile network. Consequently, the equipment is a mobile equipment, such as for example an equipment of mobile telephony or a portable telephone. The security module is a subscriber module inserted into the mobile telephone that is of the SIM card type (subscriber identity module). This assembly connects to a mobile network of the type GSM (Global System for Mobile communications), GPRS (General Packet Radio System), UMTS (Universal Mobile Telecommunications System) or the like, managed by a control server of an operator. Software applications are installed on the mobile equipment and configured in order to use the resources (data or functions) present in the subscriber module. They can thus be used in their entirety only if the security conditions are satisfied according to criteria predetermined by the operator and/or the application supplier. This verification of the criteria is in charge of the control server. The application, following the instructions sent by the control server, is finally in charge of the security module that can free or block the access to the resources necessary for the correct functioning of an application installed in the mobile equipment.

The data of these resources can comprise data such as account numbers, programs (in the form of code that can be installed in the mobile equipment), encryption/decryption keys, access rights to contents, etc.

The functions of these resources can include cryptographic algorithms, verification processes, digital signature generation processes, encryption processes, authentication process, data validation processes, access control processes, data security processes, payment processes etc.

The control server plays an essential role in managing the trust or security elements related to the set mobile equipment/subscriber module. It interprets the data that is transmitted by the mobile equipment in order to control or limit the use of applications, functions or resources available by means of the subscriber module.

The server receiving the identity information from a mobile equipment and its subscriber module and comprising IMEISV and IMSI decides, according to certain criteria, if a new instruction must be sent to the subscriber module to redefine a new protection profile that defines the resources of the subscriber module that can be used by applications executed in the mobile equipment. The criteria can refer, for example, to the updating of the software version installed on the mobile equipment, to the downloading of new applications on the mobile equipment, to the updating period of the protection profile, to a number of connections to the network, to the technology used for access to the network and to the identity of the access network used. These criteria are also related to different risks associated with the material or software used that the operator and/or the application supplier and/or the user of the mobile equipment wishes to take in account.

The method according to the invention is generally carried out during each connection of the mobile equipment to the network or after each update of the software version of the mobile equipment or of that of the subscriber module or even of that of resources on the subscriber module. It can also be carried out during each activation or deactivation of an application on the mobile equipment.

According to one embodiment, it can be carried out periodically at a rate given by the control server or after each initialization of an application on the mobile equipment. According to another embodiment, the subscriber module will not receive a new message from the control center as long as the identifier IMEISV of the mobile equipment remains unchanged.

During the re-initialization of the subscriber module, it is preferable to block a certain number of resources until the arrival of the cryptogram. Therefore, if the mobile equipment wants to intercept the cryptogram and not transmit it to the subscriber module, all or part of the resources (data or functions) of the subscriber module will be unavailable for applications carried out in the mobile equipment. According to the type of realization, it is possible that certain resources of the subscriber module used by low security level applications are implemented by default before the arrival of the cryptogram. This is also the case for resources necessary to obtain access to the network, without this the sending of the cryptogram would not be possible by this same network.

When the subscriber module verifies the validity of the cryptogram, it also indirectly identifies the mobile equipment and ensures that the data is effectively coming from the control server. In other words, by means of this cryptogram, the control server implicitly ensures the subscriber module that the type and the software version of the mobile equipment have been taken into account before transmitting instructions to the subscriber module. The latter are, in fact, loaded, if necessary, to give or refuse complete or partial authorization for the use of certain applications of the mobile equipment.

The mobile equipment plays the role of a relay in this verification step by establishing an almost direct dialogue between the subscriber module and the control server. Therefore the security of the exchanged messages is ensured from end to end between the control server and the subscriber module via the execution environment of the applications implemented on the mobile equipment. This cannot thus "cheat" or transform the data in relation to the subscriber module.

This invention also concerns a security module comprising the resources destined to be accessed locally by at least one application installed in an equipment connected to a network, said equipment comprising reading and data transmission means comprising at least the type and software version of the equipment and the identifier of the security module, said module being characterized in that it includes means for reception, analysis and execution of instructions contained in a cryptogram, said instructions conditioning the functioning of the application according to criteria predetermined by the supplier of said application and/or the operator and/or the user of the equipment.

This security module is used for example as a subscriber module or SIM card connected to a mobile equipment.

BRIEF DESCRIPTION OF THE DRAWINGS

The invention will be better understood thanks to the following detailed description that refers to the enclosed figures given as a non-limitative example, namely.

DETAILED DESCRIPTION

Figure 1:
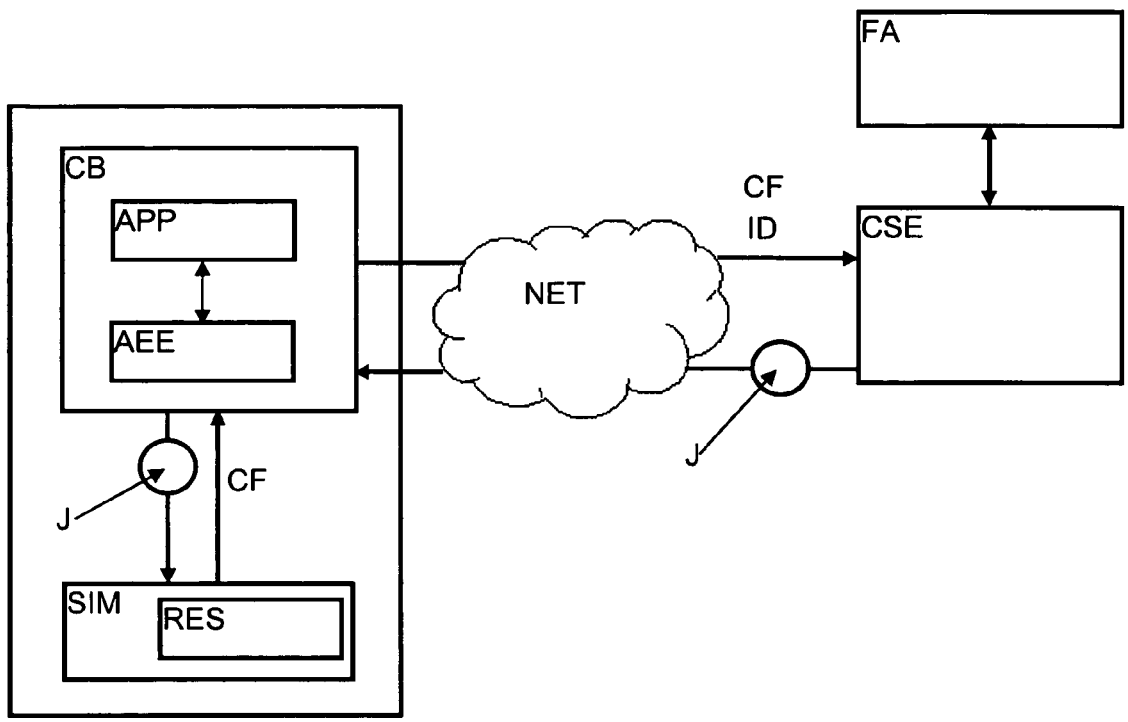
FIG. 1 illustrates a block diagram showing the different parts of the mobile equipment and of the server that contribute during the exchanges of identification data and of the cryptogram.

FIG. 1 shows the mobile equipment (CB) and subscriber module (SIM) assembly that transmits, via a mobile network (NET), identification data (ID) that is verified by the control server (CSE). The latter sends back a cryptogram (J) towards the subscriber module via the mobile equipment (CB). The mobile equipment (CB) includes one or more software applications (APP) working in an execution environment (AEE). These applications are provided either by an application supplier (FA) associated with the control server (CSE) of the operator, or they are originally programmed by the manufacturer of the mobile equipment.

The subscriber module includes resources (RES) used by software applications (APP).

Figure 2:
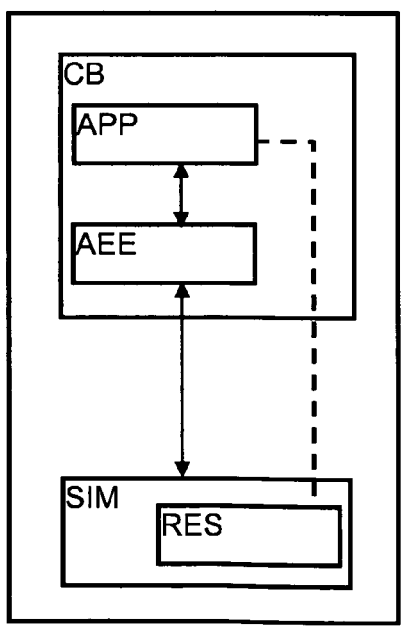
FIG. 2 represents a block diagram of the mobile equipment/subscriber module assembly with interactions between the different parts during the functioning of an application.

FIG. 2 shows that the functioning of the applications (APP) of the mobile equipment (CB) depends directly on the resources (RES) available in the subscriber module. In the absence of adequate resources, the application can either not be started or it functions in a very limited way with default parameters that can generate error messages inviting the user to complete the necessary corrective actions such as, for example, the changing of mobile equipment (CB) or of subscriber module (SIM).

The mobile equipment (CB) is identified, for example, during each request for connection to the network, to the control server (CSE) via the mobile network (NET) by transmitting preferably data specific to mobile equipment: IMEISV (International Mobile Equipment Identity and Software Version Number) and a subscriber module code: IMSI (International Mobile Subscriber Identity). The first number IMEISV is a set of 16 digits containing in particular an homologation code from the mobile equipment manufacturer, a serial number that physically identifies the mobile equipment in a unique way and the software version installed on the mobile equipment in question. The number second IMSI is a set of 15 digits and includes a code attributed by the operator, with which a user has subscribed to a subscription, allowing the identification of a subscriber in a unique way. For mobile equipment produced according to previous standards established by ETSI (European Telecommunications Standards Institute), the combination of the number IMEI composed of a set of 15 digits and of the number SVN composed of a set of 2 digits also provides the data necessary for the implementation of the method.

During the identification of mobile equipment, the control server (CSE) analyses and verifies the data (ID) transmitted and compares it with the contents of a black list (data to reject) or with a white list (accepted data). A database allows the refinement, if necessary, of the identification of a subscriber and the determination of his details such as authorized services, subscription payments and/or services executed or not, subscription period, security profile associated to the mobile equipment used, applications installed on the mobile equipment, resources available on the security module, preferences of the mobile equipment user, etc. The results of this verification are then used in order to determine a cryptogram, called a token (J), as illustrated by a small circle in FIG. 1, that the control server (CSE) transmits to the mobile equipment (CB). It should be noted that the control server (CSE) can be distinct from the mobile operator and the request coming from the mobile equipment will be forwarded towards this control authority.

The application execution environment (AEE) of the mobile equipment (CB) transmits the token (J), as it is, without altering it, to the subscriber module, the mobile equipment (CB) playing only a role of relay.

If the token (J) is valid, the subscriber module can free, respectively block certain resources (RES). The application(s) (APP) can thus be executed according to the criteria imposed by the control server (CSE). In fact, the token (J) includes or is accompanied by particular instructions intended for the subscriber module that can condition the functioning of any of the applications (APP) of the mobile equipment (CB). For example the execution of financial transactions can be limited when the subscriber is connected to another network to which he is subscribed, for example, in a country different to his country of residence (roaming) due to certain security criteria or preferences of the subscriber or preferences of the financial service supplier or due to legal constraints in force in the country in question. In another case, when a subscriber module is inserted into a mobile equipment (CB) not recognized or not homologated by the operator, the token (J) returned by the control server (CSE) can block the resources (RES) of the subscriber module and in this way prevent or alter the execution of an application(s) (APP).

In the case of a possible cloning of the mobile equipment (CB) and/or of the subscriber module (SIM), the results of the verification with the database include instructions depending on the risk that the operator accepts to take with cloned mobile telephones. For example, the token (J) generated as a result can either block all the resources (RES) of the subscriber module, or limit their use during a period of time and/or create a warning message for the subscriber via the execution environment of the applications (AEE).

The token (J) can, for example, be associated to a signature generated with the aid of a private key RSA, (Rivest, Shamir, Adelman) KRSA_Prri from a data set containing, for example, IMSI, IMEISV, the resources references of the subscriber module, a counter. This key would be known only by the control server while its public part KRSA_Pub would be known by the subscriber module. The advantage of the use of asymmetric keys resides in the fact that the key serving to create signatures is not found outside the control server (CSE).

Of course, other asymmetric key algorithms such as, for example, DSA (Digital Signature Algorithm), and ECC (Elliptic Curve Cryptography) can be used as an alternative to RSA.

The use of symmetrical key algorithms may be preferred for reasons concerning simplicity, speed of verifications or lower costs for manufacturing and implementation. In this case, the key would be known by the server (CSE) and by the subscriber module, for example, an algorithm IDEA (International Data Encryption Algorithm) could be used to sign the assembly (IMSI, IMEISV, resources reference of the subscriber module, counter). As an alternative to the IDEA algorithm, algorithms such as, for example, TDES (Triple Data Encryption Standard) and AES (Advanced Encryption Standard) can also be used.

In these two asymmetrical and symmetrical key embodiments, the subscriber module verifies the correspondence of the different fields appearing in the token (J), in particular it controls the counter (CPT) by comparing it with a corresponding counter stored in the card which is regularly updated. This counter allows avoiding the double use of the same token (J) intended for the subscriber module in order to prevent a replay attack.

An embodiment to the counter is the use of a random variable (random number) generated by the subscriber module. This random variable is transmitted with the data sent to the control server. The latter sends back this random variable in the response cryptogram and the subscriber module can verify that it concerns a new message. More generally, in order to avoid all risk of the use of an old cryptogram, the latter includes a variable predictable for the subscriber module, either a counter or a random variable.

The subscriber module also considers the resource reference (RES) that will authorize or prohibit the use by applications carried out in the mobile equipment (CB).

The subscriber module does not know as such the application references (APP) installed in the mobile equipment (CB). In fact, certain more global applications have a relatively open interface that allows them to be used for any external secondary applications. For example, it is possible to graft particular applications onto a general payment application according to the mode of payment used. The subscriber module can only be based on the references of its own resources (RES) (data or functions). By accepting the risks related to a mobile equipment, the operator makes a choice by knowing which resources (RES) of the subscriber module are used by which application(s) (APP) executed in the mobile equipment (CB).

In another embodiment, the signature made with the aid of a key of the RSA or IDEA type can be replaced by a block generated with a shared key HMAC (Keyed-Hashing for Message Authentication) from the set (IMSI, IMEISV, resource references of the subscriber module, counter). HMAC is a mechanism for message authentication through the use of cryptographic hashing functions such as MD5 (Message Digest) or SHA-1 (Secure Hash Algorithm), in combination with a shared key, namely the same key is located in the control server (CSE) and in the subscriber module.

This key, that is present at the same time in the control server (CSE) and in the subscriber module, can be loaded during the personalization of the subscriber module or during the installation of certain resources in the subscriber module. According to the options, a different key can be associated to each resource or resource group of the subscriber module, or the key can be global for the resource assembly and unique for a given subscriber module.

For more security, when the subscriber module has received a token (J), it can retransmit to the control server (CSE), via the mobile equipment (CB) and the mobile network (NET), a confirmation message (CF) confirming the correct reception and adequate processing of the token (J) by the subscriber module. The confirmation (CF) includes at least one success or error code for the operation as well as a counter, similar to that of the token (J), serving to protect against replay attacks. This message also allows the control server (CSE) to maintain updated the counter associated to the subscriber module.

In an embodiment of the invention, the mobile equipment can be replaced by non-mobile equipment such as a Pay-TV decoder or a computer. The control server receives from the security module, the equivalent of the subscriber module, the identifier of the equipment connected to the network and the identifier of the security module. In response, the server carries out the verifications as described previously and sends back a cryptogram to the security module. This response will free or block resources in the security module.

The invention claimed is:

1. A method for managing security of at least one additional application associated to a main application with a security module of an equipment connected, via a network, to a control server managed by an operator, the main application and the additional applications use resources as data or functions stored in the security module locally connected to said equipment, comprising:

the equipment, periodically sending via the network to the control server identification data including at least a type and software version of the equipment and a type and software version of the security module, analyzing and verifying by the control server the identification data upon an occurrence of at least one:
  after each connection of the equipment to the network,
  after each updating of the software version of the equipment,
  after at least one of each activation and deactivation of the additional application on the equipment,
  after each updating of the software version of the security module,
  after each updating of resources on the security module, and
  periodically at a rate given by the control server, generating, by the control server, a cryptogram from a result of the verification of the identification data by comparing the identification data to a subscriber database content, transmitting, by the control server, the cryptogram, via the network and the equipment, to the security module, receiving and analyzing the cryptogram by the security module for acting on specific applications according to instructions included in the cryptogram, and selectively activating or deactivating at least one resource as data or functions stored in said security module by executing the instructions included in the cryptogram and using the selected resource to condition the functioning of the at least one additional application stored in the equipment according to criteria established by at least one of a supplier of said additional application or the operator managing the control server, wherein the resources as data or functions of the security module used by the main application are left active for connection of the equipment to the network so as to obtain further cryptograms from the control server.

2. The method according to claim 1, wherein the equipment is a mobile equipment of mobile telephony.

3. The method according to claim 1, wherein the network is a mobile network of the GSM, GPRS or UMTS type.

4. A method according to claim 1, wherein the security module is a subscriber module of a SIM card type inserted into a mobile equipment of mobile telephony.

5. The method according to claim 4, wherein the identification data of at least one of the mobile equipment and the subscriber module comprises an identifier of the mobile equipment and an identifier of the subscriber module pertaining to a subscriber to the mobile network.

6. The method according to claim 5, wherein the subscriber module, prior to the execution of the instructions included in the cryptogram, compares the identifier of the mobile equipment with that previously received and only initiates analyzing an verifying by the control server of the identification data if the identifier of the mobile equipment has changed.

7. The method according to claim 5, wherein the control server, prior to the transmission of the cryptogram, compares the identifier of the mobile equipment with that previously received and only initiates analyzing and verifying the identification data if the identifier of the mobile equipment has changed.

8. The method according to claim 5, wherein the cryptogram is made up of a message encrypted by the control server with the aid of an asymmetrical or symmetrical encryption key from a data set containing, among other data, the identifier of the mobile equipment, the identifier of the subscriber module, resource references of the subscriber module and a predictable variable.

9. The method according to claim 8, wherein the subscriber module transmits to the control server, via the mobile equipment and the mobile network, a confirmation message when the subscriber module has received the cryptogram, said message confirming correct reception and the adequate processing of the cryptogram by the subscriber module.

10. The method according to claim 1, wherein the criteria defines usage limits of the additional application according to risks associated to the additional application and to the type and the software version of the equipment that at least one of the operator, the application supplier and an user of the equipment take in account.

11. The method according to claim 1, wherein the equipment is a Pay-TV decoder or a computer to which the security module is connected.

12. A system having a security module including resources as data or functions intended to be locally accessed by a main application and at least one additional application installed in an equipment connected, via a network, to a control server configured for managing security of the at least one additional application on at least one of each initialization, activation or deactivation of the at least one additional application, comprising:

the equipment configured to read and transmit identification data periodically via the network to the control server including at least a type and software version of the equipment and a type and software version of the security module;

the control server configured to analyze and verify the identification data upon an occurrence of at least one:
after each connection of the equipment to the network,
after each updating of the software version of the equipment,
after at least one of each activation and deactivation of the additional application on the equipment,
after each updating of the software version of the security module,
after each updating of resources on the security module, and
periodically at a rate given by the control server, the control server configured to generate a cryptogram from a result of the verification of the identification data by comparing the identification data to a subscriber database content;

the security module configured to receive and analyze the cryptogram for acting on specific applications according to instructions included in the cryptogram; and configured to selectively activate or deactivate at least one resource as data or functions stored in the security module by executing the instructions included in the cryptogram and using the selected resource to condition the functioning of the at least one additional application stored in the equipment according to criteria established by at least one of the supplier of said additional application or the operator managing the control server, wherein the resources as data or functions of the security module used by the main application are left active for connection of the equipment to the network so as to obtain further cryptograms from the control server.

13. The security module according to claim 12, constituting a subscriber module of a SIM card type connected to a mobile equipment.

* * * * *

UNITED STATES PATENT AND TRADEMARK OFFICE
CERTIFICATE OF CORRECTION

PATENT NO. : 8,001,615 B2
APPLICATION NO. : 10/577158
DATED : August 16, 2011
INVENTOR(S) : Rached Ksontini Page 1 of 1

It is certified that error appears in the above-identified patent and that said Letters Patent is hereby corrected as shown below:

Title Page, Item (30) should read

(30) Foreign Application Priority Data

November 4, 2003     (EP) ..............................03104069.4

Signed and Sealed this
Twenty-second Day of November, 2011

David J. Kappos
*Director of the United States Patent and Trademark Office*